May 8, 1934.  H. M. WILCOX  1,958,221
ROD PACKING
Filed April 23, 1931
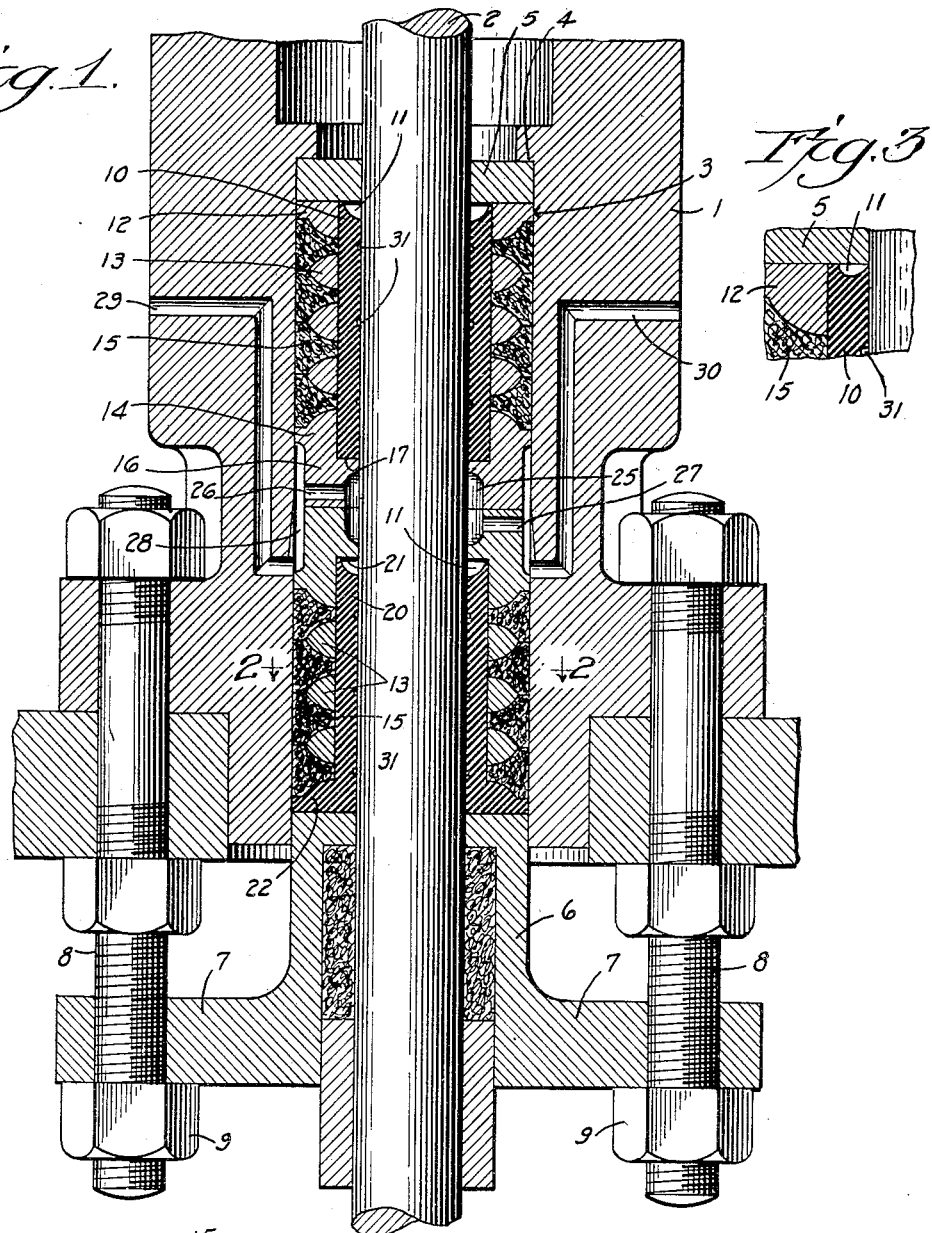
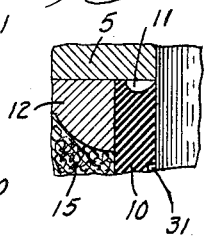
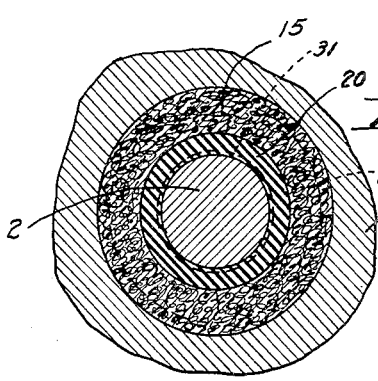
Inventor:
Henry M. Wilcox,
by Wm. H. Freudenreich
Atty.

Patented May 8, 1934

1,958,221

UNITED STATES PATENT OFFICE 1,958,221

ROD PACKING

Henry M. Wilcox, Chicago, Ill.

Application April 23, 1931, Serial No. 532,180

6 Claims. (Cl. 286—25)

The present invention relates to packing piston rods or the like so that they will operate freely without permitting fluids, under very high pressures, to escape along the rods.

The invention is particularly applicable for packing piston rods in refrigerating systems in which the refrigerant is under a very high pressure. In one of its aspects, therefore, my invention may be said to have for its object to produce a novel and effective packing that will successfully withstand the action of a refrigerant and prevent the escape of a refrigerant at high pressure past a piston rod which moves freely in the packing.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a longitudinal central section through one end of a pump cylinder showing a fragment of the piston rod and a packing arranged in accordance with the present invention; Fig. 2 is a section on line 2—2 of Fig. 1; and Fig. 3 is a section on the same plane as Fig. 1, on a larger scale, and showing a fragment of the packing after it has been in use for some time.

Referring to the drawing, 1 represents a sturdy, tubular neck forming part of the head of a cylinder from which extends a piston rod 2. The internal bore 3 of the member 1 may be in the form of a cylinder of uniform diameter, much larger than and co-axial with the piston rod. At the inner end of this bore is an internal annular shoulder 4. There may be a loose rigid follower or abutment 5 resting against this shoulder and forming the effective bottom of the cylindrical chamber in the member 1. The packing, to be hereinafter described, is compressed between this follower or abutment and a suitable gland 6 surrounding the rod and fitting slidably into the front end of the cylindrical chamber. This gland may be forced inward, along the rod, under great pressure, in any suitable manner. In the arrangement shown, the gland has laterally projecting wings 7, 7 through which pass stationary studs 8, 8. On the outer ends of the studs are nuts 9, 9. By turning these nuts in the proper direction, the gland will be forced into the cylindrical chamber.

In the drawing, I have illustrated only one style of packing which is disposed in the form of two units placed end to end; and, for the sake of brevity, I shall describe only the particular arrangement illustrated, as it will be apparent that the principle of my invention may be carried out in various ways and any desired number of similar or dissimilar units may be used.

My invention is based on the employment of a solid bearing sleeve of soft metal that surrounds the rod and is made and kept fluid-tight thereon by compressing it longitudinally and radially. This compression is brought about through a surrounding sleeve, composed of rings that engage each other along faces inclined to the long axis of the rod. This composite sleeve fits the cylindrical bore in the member 1. Consequently, when one of the solid bearing sleeves and its surrounding composite sleeve are subjected to endwise pressure, there is no room for radial expansion and, therefore, the sleeve structure, as a whole, must contract upon the rod.

Referring again to the drawing, it will be seen that there is, in the inner end of the chamber 3, a thick bearing sleeve 10 of suitable soft metal, this sleeve fitting upon the rod while permitting the latter to reciprocate freely. The inner end of the sleeve bears against the follower or abutment 5. The bore in the bearing sleeve is enlarged for a short distance at the extreme inner end, so as to produce in the sleeve an annular trough or groove, the inner side of which is formed by the rod. Preferably, the end face of the sleeve is simply dished out, as indicated at 11, so as to leave the wall of the sleeve comparatively thin at the extreme rear end. Surrounding this bearing sleeve is a composite sleeve composed of rings of metal that is soft, but yet harder than that of the bearing sleeve alternating with cushioning rings. In the arrangement shown, there is a metal ring 12 of the same diameter as the bore 3 fitting around the bearing sleeve and engaged with the follower or abutment. There are three other metal rings 13 also fitting upon the bearing sleeve, but of smaller external diameter than the chamber. There is still another metal ring 14, similar to the ring 10, at the forward end of the sleeve. Spacing the metal rings apart from each other are cushioning rings 15. I have found that very good results are obtained by making these cushioning rings of asbestos cured by means of heat and heavy pressure.

The rings are so shaped that they engage with each other along faces inclined to the axis of the rod, so that endwise pressure on the composite sleeve which they produce will tend to expand the cushioning rings and contract the metal rings.

The metal ring 14 conveniently forms part of a rigid shell 16, constituting an oil lantern into one end of which the bearing sleeve projects, and having an internal annular shoulder 17 engaged with the forward or outer end face of the bearing sleeve. When pressure is applied to the lantern in a direction to force it inward, the bearing sleeve is pressed thereby in a lengthwise direction, and the rings 12 and 13 are contracted about the bearing sleeve. Since the bearing sleeve cannot expand radially, it must contract into more intimate contact with the rod.

The second unit illustrated, and lying forwardly or outwardly from that just described, is similar to the first. The bearing sleeve 20 slides into the forward end of the lantern, abutting against a shoulder 21, similar to the shoulder 17. The ring 22, at the extreme forward end of the second unit, may form part of or be fixed to the front end of the bearing sleeve. The rings 13 and 15 are just like those previously described.

The gland 16 engages with the front or outer face of the ring 22 and sleeve 20. Consequently, when the gland is forced in, upon turning the nuts 9, the pressure thereof is transmitted to the lantern through the sleeve 20 and from the lantern to the sleeve 10; thus causing both sleeves to be compressed in the lengthwise direction. When the packing is first applied, the parts are in condition illustrated in Fig. 1. After the gland has been forced in, it will be found that there has been a sufficient flow of the metal in the bearing sleeves to cause a distortion at the inner end of each sleeve, as illustrated in Fig. 3; namely, the metal of each sleeve close to the rod, and unrestrained against endwise movement by the follower 5 in the one case, and the shoulder 21 in the other case, has flowed along the rod after further contraction toward the axis of the rod has become impossible.

In order that the grip of the bearing sleeves on the rod shall not be such as to create considerable frictional resistance, the nuts that hold the gland should be backed off slightly after the packing has initially been tightened, permitting the final seal against escaping of gas to be effected by a film of oil between the bearing sleeves and the rod.

The oil for lubricating the bearing and creating a fluid-tight joint that is practically frictionless is delivered to the lantern from which it is distributed along the rod. The lantern is simply a thick, rigid sleeve having an enlarged bore 25 between the shoulders 17 and 21. Oil passages 26 and 27 lead from this bore to the exterior of the sleeve a portion of which is reduced in diameter so as to provide between the same and the member 1 an annular passage 28. An oil inlet passage 29 extends through one side of the member 1 to the passage 28, whereas an oil outlet passage 30 leads from another point on the member 1 to the annular passage 28. When a high pressure pump, not shown, is connected to the supply passage 29, the annular chamber 28, and the chamber within the lantern, are filled with oil under pressure. Oil may be pumped constantly into these chambers and be allowed to escape, under suitable control, through the passage 30. If the pressure on the oil be great enough, there will be an effective oil seal against the escape of fluids past the rod, without having the bearing sleeves so tight on the rod as to create objectionable resistance.

The bearing sleeves are preferably provided with internal annular grooves 31 that will fill up with oil carried along by the rod; thus insuring the presence of a sufficient area of oil film between the rod and the sleeves to permit the rod to move freely and at the same time prevent leakage of gases or other fluids past the same.

It will thus be seen that I have produced a simple and novel packing for a movable rod, which may be a reciprocating piston rod or a rotating or oscillating rod or shaft, whereby there is produced a fluid-tight joint without imposing any objectionable frictional resistance to normal movements of the rod. It will further be seen that I have produced a simple and efficient means for maintaining an oil seal in such a joint, whereby the oil is made to serve the double purpose of providing a film of oil on which the rod rides and sealing the joint.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. The combination with a movable rod, of a solid continuous cylindrical bearing sleeve of soft metal surrounding the rod, a member having a cylindrical chamber larger in diameter than the sleeve and surrounding the same, rings of metal that is soft but harder than the metal of the sleeve surrounding the sleeve engaging and alternating with rings of compressed asbestos, the composite sleeve formed by the rings fitting the cylindrical wall of the chamber, the engaging faces of the rings being inclined to the long axis of the sleeve, an abutment in the chamber engaged with one end of the sleeve, and means to apply a powerful pressure against the other end of the solid sleeve and the adjacent ring in a direction to force the sleeve and the rings toward said abutment.

2. The combination with a movable rod and a member having a cylindrical chamber surrounding and co-axial with the rod, of two solid continuous bearing sleeves of soft metal surrounding the rod in said chamber and spaced apart from each other, a composite sleeve comprising a series of rings surrounding each bearing sleeve and fitting against the cylindrical wall of the chamber, the faces of the rings which engage each other being inclined to the axis of the rod, a rigid oil lantern surrounding the rod between and engaged with the inner ends of the bearing sleeves and the corresponding ends of the composite sleeves, and means to apply pressure to the other ends of the sleeves in a direction to compress the sleeves in the lengthwise direction.

3. The combination with a movable rod and a member having a cylindrical chamber surrounding and co-axial with the rod, of two solid continuous bearing sleeves of soft metal surrounding the rod in said chamber and spaced apart from each other, a composite sleeve comprising a series of rings surrounding each bearing sleeve and fitting against the cylindrical wall of the chamber, the faces of the rings which engage each other being inclined to the axis of the rod, a rigid oil lantern surrounding the rod between and engaged with the inner ends of the bearing sleeves and the corresponding ends of the composite sleeves, means to supply oil to said lantern, and means to apply pressure to the other ends of the sleeves in a direction to compress the sleeves in the lengthwise direction.

4. The combination with a member having a cylindrical chamber and a piston rod extending through and co-axial with the chamber, of two packing units surrounding the rod within the chamber and spaced apart lengthwise of the rod, each unit including a solid uninterrupted sleeve of soft metal having its wall at one end reduced in thickness to a comparatively thin edge, an oil lantern in the space between said units, means to apply pressure to said units in directions to force them toward each other and against the oil lantern while exerting on the sleeves a radial pressure and also a pressure tending to upset the thin edges of the sleeves, and means to supply oil under pressure to the lantern to lubricate the bearing and produce an oil seal.

5. The combination with a cylinder having a projecting tubular neck and a piston rod extending through and coaxial with said neck of a stationary follower surrounding said rod at the inner end of said neck, a gland entered in the outer end of said neck, means for forcing said gland inwardly, two packing units surrounding said rod between said follower and said gland and spaced apart from each other lengthwise of the rod, an oil lantern in the space between said units, each of said units including a solid continuous sleeve surrounding the rod, the inner sleeve abutting at one end against said follower and at the other end against said lantern and the outer sleeve abutting at its inner end against said lantern and at its outer end against said gland, means surrounding said sleeves between the lantern and the follower and between the lantern and said gland to produce a radial pressure upon the sleeves when the gland is forced inwardly, the inner end of each sleeve having its wall reduced in thickness to a comparatively thin edge, each sleeve having oil grooves extending around the rod in the inner bearing face of the sleeve, and means to supply oil under pressure to the lantern to lubricate the bearing and produce oil seals between the sleeves and the rod.

6. The combination with a movable rod, of a solid continuous cylindrical bearing sleeve of soft metal surrounding the rod, a member having a cylindrical chamber larger in diameter than the sleeve and surrounding the same, a composite sleeve formed of rings fitting around said bearing sleeve and against the cylindrical wall of said chamber, the engaging faces of the rings being inclined to the long axis of the sleeve, an abutment at one end of said chamber engaged with corresponding ends of said sleeves, and means to apply pressure in the direction of said axis against the opposite ends of said sleeves.

HENRY M. WILCOX.